United States Patent [19]
Gregg

[11] Patent Number: 5,421,789
[45] Date of Patent: * Jun. 6, 1995

[54] SYNCHRONOUS DRIVE PULLEY AND ITS COMBINATION WITH A BELT HAVING OBLIQUE AND OFFSET TEETH

[75] Inventor: Michael J. W. Gregg, Lincoln, Nebr.

[73] Assignee: The Goodyear Tire & Rubber Company, Akron, Ohio

[*] Notice: The portion of the term of this patent subsequent to May 11, 2010 has been disclaimed.

[21] Appl. No.: 43,687

[22] Filed: Apr. 8, 1993

Related U.S. Application Data

[62] Division of Ser. No. 890,203, May 29, 1992, Pat. No. 5,209,705.

[51] Int. Cl.6 .............................................. F16H 55/00
[52] U.S. Cl. ...................................................... 474/153
[58] Field of Search ................................. 474/152-153, 474/204, 205, 238, 268

[56] References Cited

U.S. PATENT DOCUMENTS

| | | | |
|---|---|---|---|
| 3,643,518 | 2/1972 | Semin et al. | 474/205 X |
| 4,037,485 | 7/1977 | Hoback | 474/153 X |
| 4,041,789 | 8/1977 | Hoback | 474/153 X |
| 4,108,011 | 8/1978 | Gregg et al. | 474/153 |
| 4,147,069 | 4/1979 | Derner | 474/204 X |
| 4,403,979 | 9/1983 | Wujick | 474/153 |
| 4,427,403 | 1/1984 | Kanamori et al. | 474/153 |
| 4,605,389 | 8/1986 | Westhoff | 474/153 |
| 4,775,357 | 10/1988 | Wolfe | 474/205 |
| 4,915,674 | 4/1990 | Tanaka et al. | 474/205 X |
| 4,929,221 | 5/1990 | Tanaka et al. | 474/205 |
| 5,209,705 | 5/1993 | Gregg | 474/204 |

*Primary Examiner*—Michael Powell Buiz
*Attorney, Agent, or Firm*—Marc R. Dion, Sr.

[57] ABSTRACT

A synchronous drive pulley having pulley cavities which are complementary to a synchronous drive belt which has at least two adjacent rows of teeth which are at oppositely balanced oblique angles to the longitudinal direction of the belt. In addition, the centerlines of the teeth in the adjacent rows are offset from each other by a distance of up to 10% to 90% of their pitch.

2 Claims, 2 Drawing Sheets

SYNCHRONOUS DRIVE PULLEY AND ITS COMBINATION WITH A BELT HAVING OBLIQUE AND OFFSET TEETH

This is a divisional application of Ser. No. 07/890,203, filed May 29, 1992, now U.S. Pat. No. 5,209,705.

BACKGROUND OF THE INVENTION

The present invention relates to a synchronous drive belt designed to minimize noise while in operation.

Conventional synchronous drive belts have teeth placed at right angles to the belt mid-circumferential plane such as illustrated in my prior U.S. Pat. Nos. 3,924,481 and 4,108,011. In such belts the whole tooth then engages with a corresponding pulley cavity at the same time, in a manner analogous to a rack and pinion gear. This engagement results in some impact between the belt and the pulley and causes air to be suddenly expelled from the pulley cavity. This in turn results in noise. Spectrum analysis of noise generated by synchronous drive belts typically shows the dominant frequencies being that of tooth engagement, and harmonics of that frequency.

U.S. Pat. Nos. 4,679,459 and 4,951,261 illustrate gear systems having staggered or offset teeth to reduce noise and wear. U.S. Pat. No. 3,033,050 illustrates a belt/pulley combination wherein the belt has teeth in a herringbone design to center the belt over a V-shaped cavity of a pulley in order to preclude axial movement of the belt on the pulley.

SUMMARY OF THE INVENTION

In accordance with the practice of the present invention, there is provided a synchronous drive belt comprised of a resilient elastomer, reinforced with one or more reinforcing members extending along and thereby defining a pitch line, with at least two transversely adjacent rows of teeth, having centerlines, uniformly spaced apart in the longitudinal direction by their Pitch P and extending obliquely to the longitudinal direction such that the teeth in the transversely adjacent rows are at oppositely balanced angles and the centerlines of said adjacent teeth are offset from each other by a distance of from 10% to 90% of the Pitch P.

DETAILED DESCRIPTION OF THE INVENTION

Figure 2:
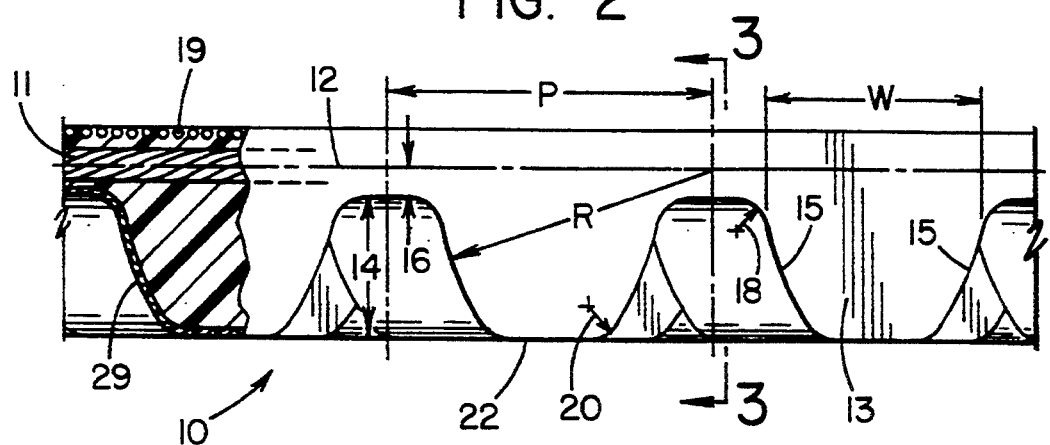
FIG. 2 is a side view partly in section taken along line 2—2 of FIG. 1.
Figure 1:
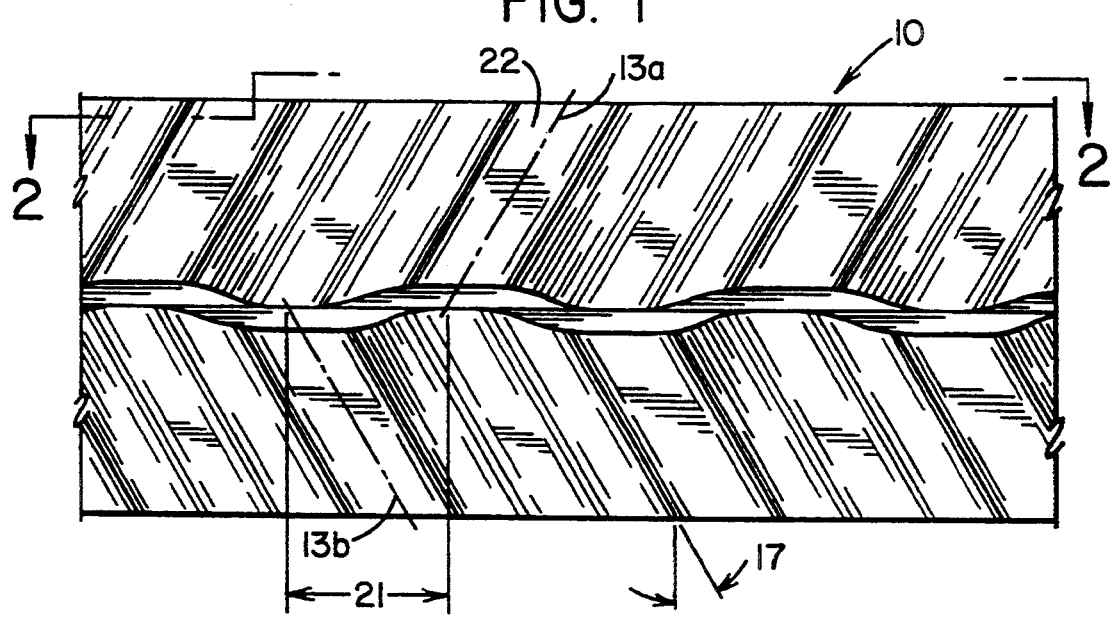
FIG. 1 is a bottom plan view of a portion of a synchronous drive belt of the present invention.
Figure 3:
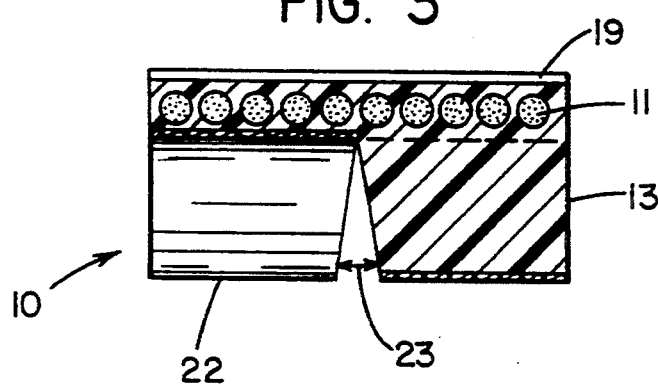
FIG. 3 is a transverse cross-sectional view of the belt taken along line 3—3 of FIG. 2.
Figure 4:
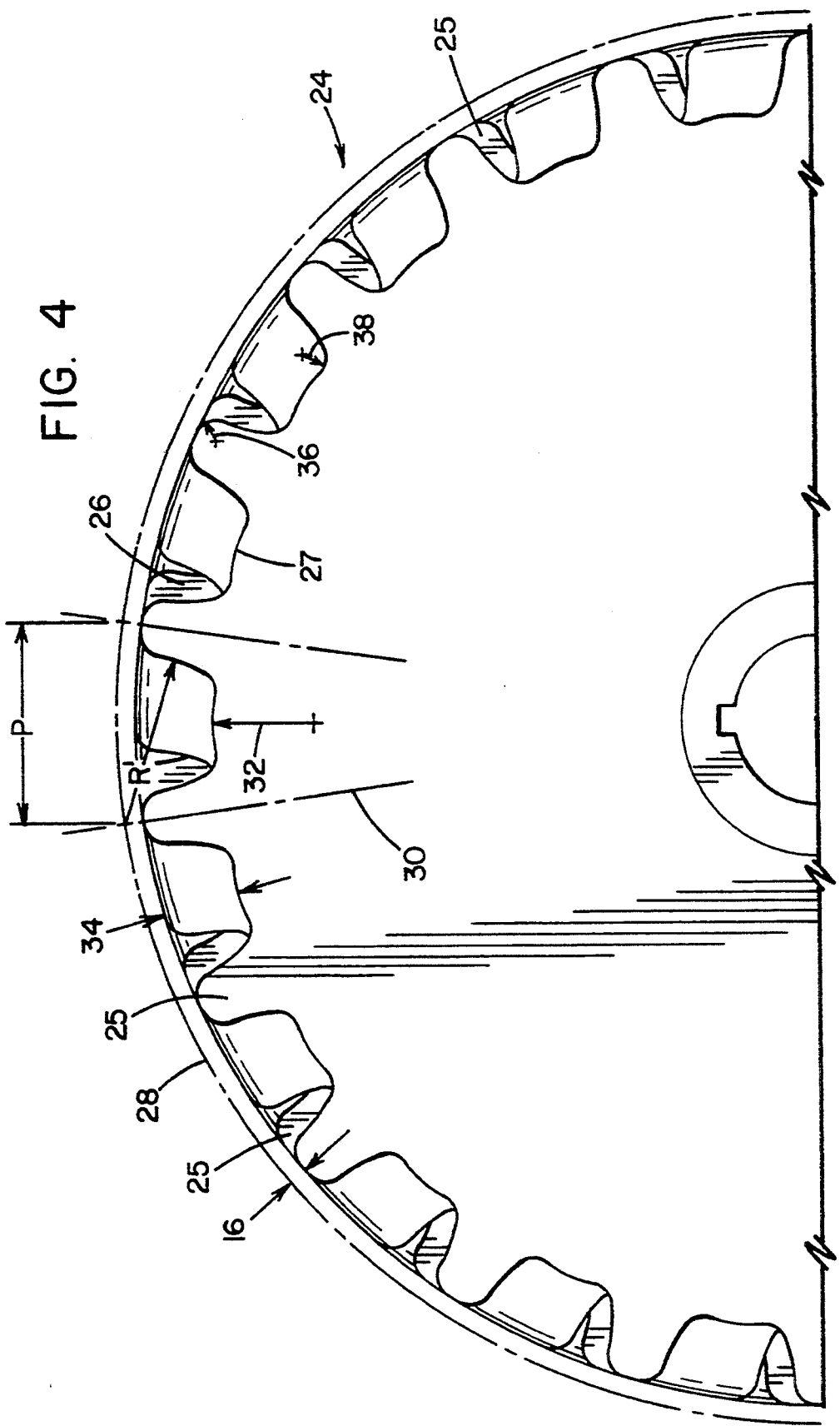
FIG. 4 is a side view of a portion of a pulley which is compatible with the belt of the invention.

The drawings illustrate a synchronous drive belt shown generally at 10 which is made of a resilient elastomer and reinforced with a longitudinal tensile member 11 which lies along the pitch line 12 and is made up usually of a plurality of cords of a high elastic modulus. These cords may be made from glass fiber, carbon fiber, steel, polyester, high tenacity rayon or preferably, polyaramide. The tooth surface 22 may, if required, be reinforced with an abrasion resistant fabric 29, an example of which is nylon. The elastomers may be any one of those known to be suitable for use in such belts, e.g., polychloroprene, polyurethane, NBR, IIR, IR, SBR, CSM, EPDM, other thermosets, thermoplastic elastomers and other polymer alloys.

The belt 10 has at least two transversely adjacent rows of teeth 13, having centerlines 13a and 13b. The teeth 13 are uniformly spaced apart in the longitudinal direction by their Pitch P and extend obliquely to the longitudinal direction such that the teeth 13 in the transversely adjacent rows are at oppositely balanced angles 17 and the centerlines 13a and 13b are offset from each other by a distance 21 of from 10% to 90% of the Pitch P. Preferably, the offset ranges from 40% to 60% of the Pitch P. Optimally, the offset distance is 50% of the Pitch P. The oblique angle 17 can range from 15° to 45°.

Each tooth 13 has fore and aft flank surfaces 15,15 which describe an arc having a radius R whose center is illustrated at the junction of the pitch line 12 and midway between adjacent teeth. It can be appreciated, however, that the center of the radius R can be located at different points, e.g., as are taught by my previously mentioned prior patents. The length of the radius R is generally about 70% to 90% of the Pitch P. The width of the tooth W is determined by the length of the radius R and its center point. The belt tooth height 14 is about 30% to about 55% of the Pitch P. To provide smooth transitions between the belt flanks 15 and the land area defined as the surface between the teeth, there is provided a belt tooth root radius 18. The belt tooth tip blend radius 20 provides a smooth transition between the belt flank 15 and the belt tooth tip 22. While not a necessity, it is useful to construct the belt so that the adjacent rows of teeth 13 are separated by a gap 23 in order to reduce frictional disengagement from the pulley cavities 26.

The pulley shown generally at 24 has a series of complimentary teeth 25 evenly spaced apart by the Pitch P. The space between the teeth 25 defines the cavity 26 having a cavity base 27. The cavity 26 has fore and aft flank surfaces which describe an arc having a radius R' which is equal to or greater than the belt tooth flank radius R. The cavity depth 34 can be from 85% to 105% of the belt tooth depth 14. The center of the radius R' is shown at the intersection of a pulley tooth radial centerline 30 and the pitch circle 28 which defines an imaginary line which is beyond the outer radius of the pulley tooth by the pitch line differential 16 which corresponds to the distance between the land area between the belt teeth and the pitch line 12.

The cavity base 27 can be flat or it can be an arc of a circle having a radius 32 which is located below the cavity base 27. Smooth transitions from the cavity flanks to the pulley tooth tip and to the cavity base are provided by the pulley tooth tip blend radius 36 and the pulley cavity base blend radius 38 respectively.

The pulleys may be made from metal, thermoplastic or thermosetting materials. Optionally, the belts of the invention may be provided with additional transverse rigidity by transverse reinforcement 19.

While certain representative embodiments and details have been shown for the purpose of illustrating the invention, it will be apparent to those skilled in this art that various changes and modifications may be made therein without departing from the spirit or scope of the invention.

What is claimed is:

1. A synchronous drive pulley comprising a series of pulley teeth evenly spaced apart in the circumferential direction by a Pitch P and having defined between said teeth pulley cavities; said cavities having fore and aft flank surfaces which describe an arc having a radius of R' which is equal to or greater than a belt tooth flank radius R of a toothed belt which is complementary to said cavity; wherein the cavity has a depth which is from 85% to 105% of the depth of said belt tooth; and wherein said pulley has at least two (2) transversely adjacent rows of cavities having centerlines uniformly spaced apart in a longitudinal direction by the Pitch P and extending obliquely to the longitudinal direction such that the cavities in the transversely adjacent rows are at oppositely balanced angles and the centerlines of said adjacent cavities are offset from 10% to 90% of the Pitch P.

2. A combination comprising a synchronous drive pulley comprising a series of pulley teeth evenly spaced apart in the circumferential direction by a Pitch P and having defined between said teeth pulley cavities; said cavities having fore and aft flank surfaces which describe an arc having a radius of R' which is equal to or greater than a belt tooth flank radius R of a toothed belt which is complementary to said cavity; wherein the cavity has a depth which is from 85% to 105% of the depth of said belt tooth; and wherein said pulley has at least two (2) transversely adjacent rows of cavities having centerlines uniformly spaced apart in a longitudinal direction by the Pitch P and extending obliquely to the longitudinal direction such that the cavities in the transversely adjacent rows are at oppositely balanced angles and the centerlines of said adjacent cavities are offset from 10% to 90% of the Pitch P; and a synchronous drive belt comprised of a resilient elastomer, reinforced with one or more reinforcing members extending along and thereby defining a pitch line, with at least two transversely adjacent rows of teeth having centerlines uniformly spaced apart in the longitudinal direction by the Pitch P and extending obliquely to the longitudinal direction such that the teeth in the transversely adjacent rows are at oppositely balanced angles and the centerlines of said adjacent teeth are offset from each other by a distance of from 10% to 90% of the Pitch P.

* * * * *